US009743288B2

(12) United States Patent
Grosspietsch et al.

(10) Patent No.: US 9,743,288 B2
(45) Date of Patent: Aug. 22, 2017

(54) METHOD AND APPARATUS FOR MITIGATING TRANSMISSION INTERFERENCE BETWEEN NARROWBAND AND BROADBAND MOBILE DEVICES

(71) Applicant: MOTOROLA SOLUTIONS, INC., Schaumburg, IL (US)

(72) Inventors: John K. Grosspietsch, Libertyville, IL (US); Michael H. Baker, Elmhurst, IL (US); Isam R. Makhlouf, Lake Zurich, IL (US); Mark Shahaf, Vernon Hills, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 269 days.

(21) Appl. No.: 13/723,942

(22) Filed: Dec. 21, 2012

(65) Prior Publication Data
US 2014/0177457 A1    Jun. 26, 2014

(51) Int. Cl.
*H04W 28/02*    (2009.01)
*H04W 72/08*    (2009.01)
(Continued)

(52) U.S. Cl.
CPC ......... *H04W 24/02* (2013.01); *H04J 11/0066* (2013.01); *H04W 72/02* (2013.01);
(Continued)

(58) Field of Classification Search
CPC ......... H04W 28/0231; H04W 28/0236; H04W 28/0242; H04W 72/082;
(Continued)

(56) References Cited

U.S. PATENT DOCUMENTS 6,675,020 B2    1/2004  Sawyer
7,907,572 B2    3/2011  Yang et al.
(Continued)

FOREIGN PATENT DOCUMENTS

WO    2011072884 A1    6/2011
WO    2011148341 A1    12/2011

OTHER PUBLICATIONS

Ghafari et al., Top-Loaded UWB Monopole Antenna for Automotive Applications, Jul. 8, 2014-Jul. 14, 2014, Antennas and Propagation Society International Symposium (APSURSI), 2012 IEEE, 2 pages.*

(Continued)

*Primary Examiner* — Hoon J Chung (57) ABSTRACT

A method and apparatus to mitigate radio frequency interference by a broadband mobile device by detecting, at the broadband mobile device, a geographically or physically proximate narrowband uplink transmission, wherein the narrowband uplink transmission is in close enough spectral proximity to at least one bearer channel of the broadband mobile device to result in interference on the narrowband reception when the broadband mobile device is transmitting and a narrowband mobile device is receiving, determining, based on the detected narrowband uplink transmission, a corresponding narrowband downlink frequency, monitoring the determined narrowband downlink frequency, detecting a narrowband downlink transmission at the monitored narrowband downlink frequency, and in response to detecting the narrowband downlink transmission at the monitored narrowband downlink frequency, modifying a broadband uplink transmission to ensure the broadband uplink transmission does not interfere with narrowband downlink reception.

17 Claims, 4 Drawing Sheets

(51) Int. Cl.
*H04W 24/02* (2009.01)
*H04W 72/02* (2009.01)
*H04J 11/00* (2006.01)
*H04L 25/03* (2006.01)
*H04L 27/26* (2006.01)

(52) U.S. Cl.
CPC .... *H04L 25/03343* (2013.01); *H04L 27/2601* (2013.01); *H04W 72/082* (2013.01)

(58) Field of Classification Search
CPC .......... H04W 28/04–28/048; H04W 52/0238; H04W 52/243; H04W 52/244
USPC .............. 370/329, 330; 455/63.1, 63.2, 63.3
See application file for complete search history.

(56) References Cited

U.S. PATENT DOCUMENTS

| | | | |
|---|---|---|---|
| 8,130,436 | B2 | 3/2012 | Borchers |
| 2002/0006174 | A1 | 1/2002 | Nafie et al. |
| 2003/0016771 | A1* | 1/2003 | Nuutinen ............. H04B 1/1036 375/346 |
| 2006/0050775 | A1* | 3/2006 | Li et al. ..................... 375/150 |
| 2006/0160550 | A1 | 7/2006 | Edwards |
| 2006/0188003 | A1* | 8/2006 | Larsson ..................... 375/130 |
| 2009/0068956 | A1* | 3/2009 | Naito et al. ................ 455/67.11 |
| 2009/0196230 | A1 | 8/2009 | Kim et al. |
| 2010/0029289 | A1 | 2/2010 | Love et al. |
| 2010/0074189 | A1 | 3/2010 | Wang et al. |
| 2010/0074209 | A1 | 3/2010 | Montojo et al. |
| 2010/0128689 | A1 | 5/2010 | Yoon et al. |
| 2011/0117967 | A1* | 5/2011 | Vedantham et al. .......... 455/561 |
| 2011/0317647 | A1 | 12/2011 | Cho et al. |
| 2012/0082070 | A1 | 4/2012 | Hart et al. |
| 2012/0155436 | A1 | 6/2012 | Lindoff |
| 2012/0164948 | A1 | 6/2012 | Narasimha et al. |
| 2012/0207040 | A1 | 8/2012 | Comsa et al. |
| 2012/0322453 | A1 | 12/2012 | Weng et al. |
| 2013/0122811 | A1 | 5/2013 | Scribano et al. |

OTHER PUBLICATIONS

Corresponding International Application No. PCT/US2013/071833—International Search Report and Written Opinion—mailed Apr. 9, 2014.

* cited by examiner

METHOD AND APPARATUS FOR MITIGATING TRANSMISSION INTERFERENCE BETWEEN NARROWBAND AND BROADBAND MOBILE DEVICES

FIELD OF THE INVENTION

The present invention relates to wireless communications and, more particularly, to mitigating transmission interference between digital radio and broadband mobile devices.

BACKGROUND OF THE INVENTION

The Federal Communications Commission (FCC) is responsible for allocating the finite radio frequency spectrum among various government entities, cellular telephone and data carriers, and a host of competing corporate and individual interests. In that capacity, the FCC has allocated certain frequency bands for use by and for the benefit of local, state, and national public safety organizations and applications.

Figure 1:
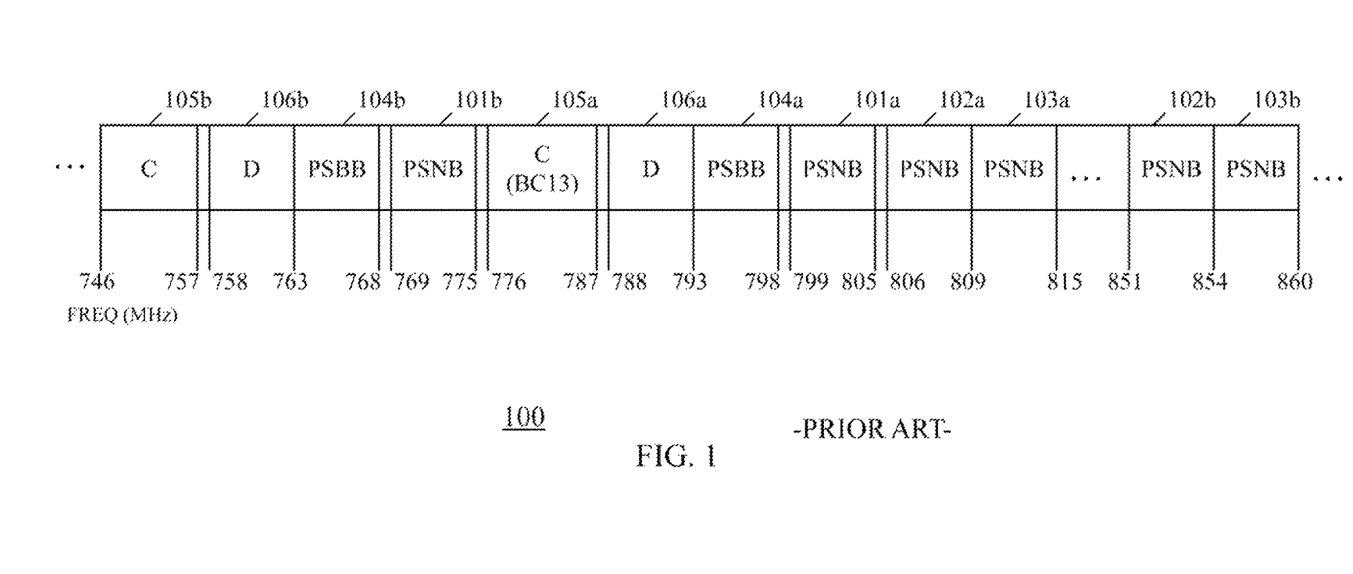
FIG. 1 illustrates a portion of the electromagnetic spectrum including bandwidths allocated to public safety applications and public operators.

Referring to FIG. 1, a portion 100 of the electromagnetic spectrum, including bandwidths allocated by the FCC to public safety applications, is depicted. A frequency band 101a from 799 to 805 megahertz (MHz) has been allocated for uplink (UL) transmissions by public safety narrowband (PSNB) voice communications by police, fire, and other emergency response teams. Frequency band 101a is paired with a frequency band 101b from 769 to 775 MHz that has been allocated for downlink (DL) transmissions by such PSNB voice communications by police, fire, and other emergency response teams. These frequencies support "push-to-talk" land mobile radio (LMR) two-way radio devices used by law enforcement agencies across the country. Similarly, a frequency band 102a from 806 to 809 MHz, and a frequency band 103a from 809 to 815 MHz, has each been allocated for UL PSNB transmissions and is each respectively paired with a frequency band 102b from 851 to 854 MHz, and a frequency band 103b from 854 to 860 MHx, that has been allocated for DL PSNB transmissions.

A frequency band 104a from 793 to 798 MHz has been allocated for UL broadband public safety transmissions, for example, by police, fire, and other emergency response teams. Frequency band 104a is, in turn, paired with a frequency band 104b from 763 to 768 MHz that has been allocated for DL broadband public safety transmissions by police, fire, and other emergency response teams. The FCC has mandated the use of Third Generation Partnership Project (3GPP) Long Term Evolution (LTE) technology in this broadband spectrum. This corresponds to the upper portion of the 3GPP evolved universal mobile telecommunications system terrestrial radio access (E-UTRA) operating band 14 of the frequency spectrum.

The FCC also has designated a frequency band 105a from 776 to 787 MHz for UL broadband transmissions, and paired with a frequency band 105b from 746 to 756 MHz for DL broadband transmissions (referred to as operating band 13, or BC13, and also expected to be LTE compliant) by public operators, such as Verizon Wireless.

Further, the FCC has designated a frequency band 106a from 788 to 793 MHz for UL broadband operations (possibly with shared access) for public safety transmissions, and has paired this with a frequency band 106b, from 758 to 763 MHz, for DL broadband operations (possibly with shared access) for public safety transmissions, which also may be mandated as LTE compliant. This corresponds to the lower portion of the 3GPP E-UTRA operating band 14.

Because the foregoing public safety broadband spectrum allocations are spectrally near the PSNB voice band, some of the energy from the broadband allocations may "leak" into a PSNB network. Under certain conditions, this leakage, known as out-of-band emissions (DOBE), may cause undesirable radio interference to communications between an LMR base station and one or more of LMR mobile devices, for example, resulting in desensitization of a receiver of the LMR mobile device, particularly when the LMR mobile device is geographically co-located (for example, in the same police car or fire truck or even in a same radio) with the interfering broadband radio/mobile device. Those skilled in the art will appreciate that base stations and vehicular radio frequency tuning equipment can employ cavity filters that can selectively determine a desired frequency range to be transmitted; however, such cavity filters are expensive and typically cannot eliminate OOBE entirely and, further, are too large for use in handheld products.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

Accordingly, to address the need for mitigating interference caused by out-of-band emissions of a broadband transmitter, a method and a broadband mobile device are provided that mitigate interference caused by OOBEs, particularly in public safety networks, by detecting, at the broadband mobile device, a geographically or physically proximate narrowband uplink transmission, wherein the narrowband uplink transmission is in close enough spectral proximity to at least one bearer channel of the broadband mobile device to result in interference on the narrowband reception when the broadband mobile device is transmitting and a narrowband mobile device is receiving, determining, based on the detected narrowband uplink transmission, a corresponding narrowband downlink frequency, monitoring the determined narrowband downlink frequency, detecting a narrowband downlink transmission at the monitored narrowband downlink frequency, and in response to detecting the narrowband downlink transmission at the monitored narrowband downlink frequency, modifying a broadband uplink transmission to ensure the broadband uplink transmission does not interfere with narrowband downlink reception.

Generally, an embodiment of the present invention encompasses a method for mitigating radio frequency interference by a broadband mobile device. The method includes detecting, at a broadband mobile device, a geographically or physically proximate narrowband uplink transmission, wherein the narrowband uplink transmission is in close enough spectral proximity to at least one bearer channel of the broadband mobile device to result in interference on the narrowband reception when the broadband mobile device is transmitting and a narrowband mobile device is receiving, and determining, based on the detected narrowband uplink transmission, a corresponding narrowband downlink frequency. The method further includes monitoring the determined narrowband downlink frequency, detecting a narrowband downlink transmission at the monitored narrowband downlink frequency, and in response to detecting the narrowband downlink transmission at the monitored narrowband downlink frequency, modifying a broadband uplink transmission to ensure the broadband uplink transmission does not interfere with narrowband downlink reception.

Another embodiment of the present invention encompasses a mobile device capable of operating in an OFDMA communication system. The mobile device includes an at least one receiver that is configured to receive broadband communications and narrowband communications and a transmitter that is configured to transmit broadband communications. The mobile device further includes a processor that is configured to detect a geographically or physically proximate narrowband uplink transmission, wherein the narrowband uplink transmission is in close enough spectral proximity to at least one bearer channel of the mobile device to result in interference on the narrowband reception when the mobile device is transmitting and a narrowband mobile device is receiving, determine, based on the detected narrowband uplink transmission, a corresponding narrowband downlink frequency, monitor the determined narrowband downlink frequency, detect a narrowband downlink transmission at the monitored narrowband downlink frequency, and in response to detecting the narrowband downlink transmission at the monitored narrowband downlink frequency, modify a broadband uplink transmission to ensure the broadband uplink transmission does not interfere with narrowband downlink reception.

Yet another embodiment of the present invention encompasses a system for mitigating radio frequency interference between narrowband public safety and broadband communications devices. The system includes a narrowband mobile device configured to transmit and receive narrowband communications and a Third Generation Partnership Project (3GPP)-conforming mobile device configured to communicate with a 3GPP-conforming broadband network. Further, the 3GPP-conforming mobile device is configured to mitigate the potential for interference between the narrowband mobile device and the 3GPP-conforming mobile device by detecting a narrowband uplink transmission, determining, based on the detected narrowband uplink transmission, a corresponding narrowband downlink frequency, monitoring the determined narrowband downlink frequency, detecting a narrowband downlink transmission at the monitored narrowband downlink frequency, and in response to detecting the narrowband downlink transmission at the monitored narrowband downlink frequency, modifying a broadband uplink transmission to ensure the broadband uplink transmission does not interfere with narrowband downlink reception.

Figure 2:
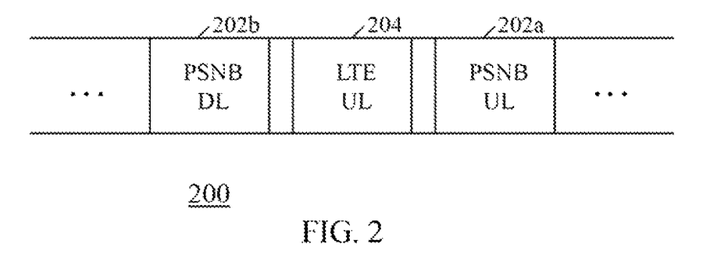
FIG. 2 illustrates an exemplary segment from a radio frequency (RF) portion of an electromagnetic spectrum comprising frequency bands that are adjacent to or nearby each other and that are spectrally distinct in accordance with an embodiment of the present invention.

The present invention may be more fully described with reference to FIGS. 2-6. FIG. 2 is an exemplary segment 200 from a radio frequency (RF) portion of an electromagnetic spectrum illustrating frequency bands that are spectrally proximate to, that is, adjacent to or nearby, each other and that are spectrally distinct. More particularly, segment 200 includes a Public Safety Narrowband (PSNB) frequency band 202a reserved for uplink (UL) transmissions, such as frequencies ranging from 799 megahertz (MHz) to 805 MHz, 806 to 809 MHz, or 809 to 815 MHz. The lower portion of band 202a is paired with a PSNB frequency band 202b reserved for downlink (DL) transmissions, with frequencies ranging from 769 to 775 MHz. The upper two portions of 202a are paired with downlink spectrum with frequencies ranging from 851 to 854 MHz, or 854 to 860 MHz, respectively. A nearby (or adjacent) frequency band 204 may include frequencies ranging from 776 to 799 MHz, and is allocated to broadband uplink transmissions for LTE-compliant public operators and/or public safety communications. In particular, band 204 may include, inter alia, one or more of the following bands: 776 to 787 MHz, 788 to 793 MHz, and 793 to 799 MHz.

Figure 3:
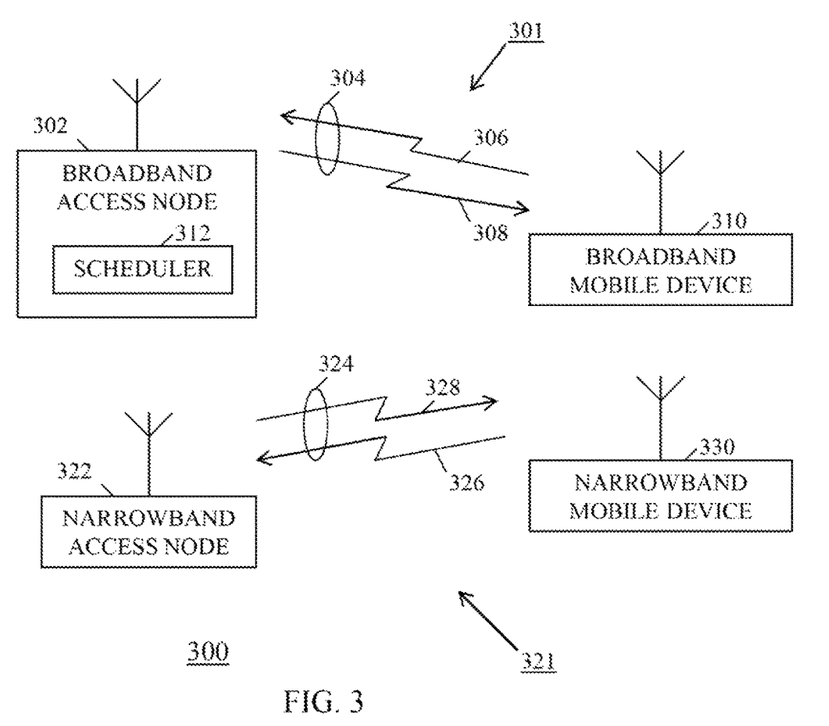
FIG. 3 is a block diagram of a wireless communication system in accordance with various embodiments of the present invention.

Referring now to FIG. 3, a block diagram is provided that illustrates a wireless communication system 300 in accordance with various embodiments of the present invention. Communication system 300 includes a first, broadband network 301 and a second, narrowband network 321. Broadband network 301 comprises a first, broadband wireless access node 302 that supports broadband communications with a corresponding first, broadband mobile device 310 via a first, broadband air interface 304. Air interface 304 includes an uplink (UL) 306 that transmits over frequency band 204 and a downlink (DL) 308, which DL and UL each includes one or more bearer channels and one or more signaling channels. Access node 302 further includes, or may be coupled to, a scheduling module 312 that performs the scheduling functions with respect to broadband mobile device 310 described herein.

Narrowband network 321 comprises a second, narrowband wireless access node 322 that supports narrowband communications with a second, narrowband mobile device 330 via a second, narrowband air interface 324 that utilizes frequency bands 202*a* and 202*b* that are spectrally proximate to, that is, adjacent to or nearby, frequency band 204 utilized by broadband network 301. More particularly, air interface 324 includes an uplink (UL) 326 that transmits over frequency band 202*a* and a downlink (DL) 328 that transmits over frequency band 202*b*, which UL and DL each includes one or more bearer channels and one or more signaling channels.

Figure 4:
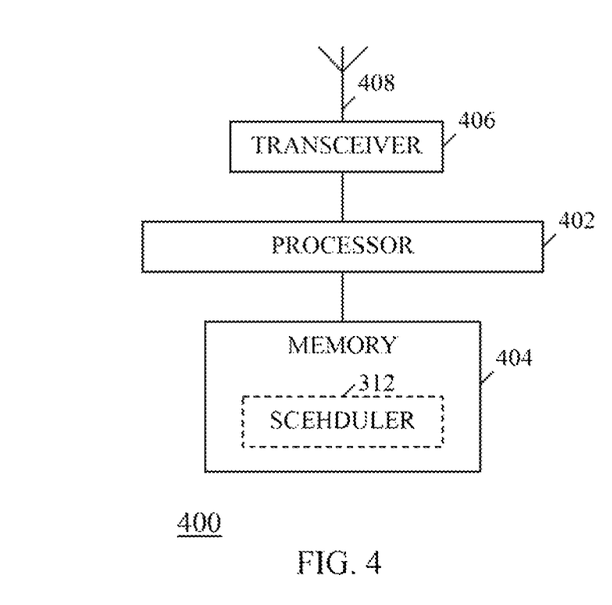
FIG. 4 is a block diagram of a wireless access node of the communication system of FIG. 3 in accordance with an embodiment of the present invention.

Referring now to FIG. 4, a block diagram is provided of a wireless access node 400, such as wireless access nodes 302 and 322, for example, a base station, an eNode B, a Public Safety Base Station or an access point, in accordance with an embodiment of the present invention. Wireless access node 400 includes a processor 402, such as one or more microprocessors, microcontrollers, digital signal processors (DSPs), combinations thereof or such other devices known to those having ordinary skill in the art. Processor 402 is coupled to an at least one memory device 404, such as random access memory (RAM), dynamic random access memory (DRAM), and/or read only memory (ROM) or equivalents thereof, that maintains data and programs that may be executed by the processor and that allow the communication device to perform all functions necessary to operate in a wireless communication system. Wireless access node 400 further includes a transceiver 406 that includes a radio frequency (RF) receiver and an RF transmitter, that is operationally coupled to processor 402 and to an antenna 408, and that provides for wirelessly transmitting and receiving messages by the access node.

Access node 400 may further include, for example, in the case of access node 302, scheduling module 312, which scheduling module is implemented by processor 402 based on data and software maintained in the at least one memory device 404 of the access node. However, in other embodiments of the present invention, scheduling module 312 may be included in a network element separate from, and in communication with, the access node and comprising its own processor and at least one memory device.

Figure 5:
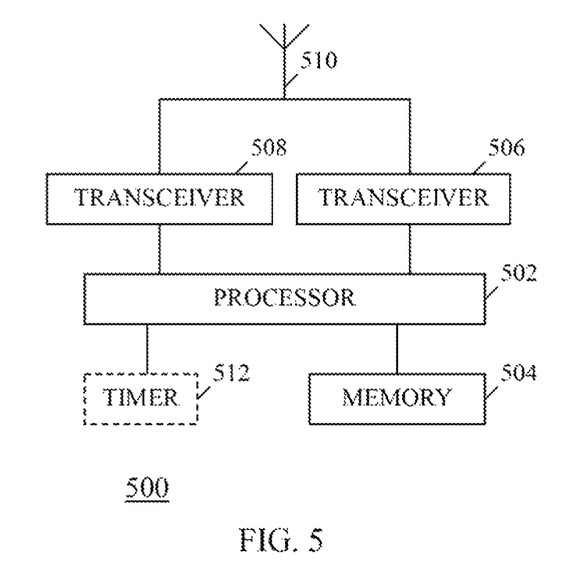
FIG. 5 is a block diagram of a mobile device of the communication system of FIG. 3 in accordance with an embodiment of the present invention.

FIG. 5 is a block diagram of a mobile device 500, such as mobile devices 310 and 330, for example, a cellular telephone, a radiotelephone, a smartphone, or a personal digital assistant, laptop computer, tablet computer, or personal computer with wireless communication capabilities, in accordance with an embodiment of the present invention. Mobile device 500 includes a processor 502, such as one or more microprocessors, microcontrollers, digital signal processors (DSPs), combinations thereof or such other devices known to those having ordinary skill in the art. Processor 502 is coupled to an at least one memory device 504, such as random access memory (RAM), dynamic random access memory (DRAM), and/or read only memory (ROM) or equivalents thereof, that maintains data and programs that may be executed by the processor and that allow the communication device to perform all functions necessary to operate in a wireless communication system. Mobile device 500 further includes at least one transceiver 506, 508 (two shown) that each includes a radio frequency (RF) receiver and an RF transmitter, that are operationally coupled to processor 502 and to an antenna 510, and that provide for wirelessly transmitting and receiving messages by the mobile device. For example, broadband mobile device 310 is capable of receiving both broadband network transmissions and narrowband network transmissions, and may do so by employing two separate radios, that is, transceivers 506, 508, or may use a single radio or transceiver that switches between a monitoring of broadband network 301 and of narrowband network 321. In addition, mobile device 500 may include a timer 512 that, for example, counts down a delay period associated with a delay in a data transmission by broadband mobile device 310.

The functionality described herein as being performed by access nodes 302 and 322 and mobile devices 310 and 330 is implemented with or in software programs and instructions stored in the respective at least one memory devices 404 and 504 associated with the access nodes and mobile devices and executed by the processor 402 and 502 associated with the access node or mobile device. However, one of ordinary skill in the art realizes that the embodiments of the present invention alternatively may be implemented in hardware, for example, integrated circuits (ICs), application specific integrated circuits (ASICs), and the like, such as ASICs implemented in one or more of the scheduler, access nodes, and mobile devices. Based on the present disclosure, one skilled in the art will be readily capable of producing and implementing such software and/or hardware without undo experimentation.

Broadband network 301 may be any type of multi-carrier wireless communication network, such as communication network that employs an Orthogonal Frequency Division Multiplexing (OFDM) modulation scheme, wherein the broadband spectrum, that is, frequency bandwidth, is split into multiple frequency sub-bands, or resource blocks, during a given time period. Each sub-band comprises multiple orthogonal frequency sub-carriers over a given number of OFDM symbols, that are the physical layer channels over which traffic and signaling channels are transmitted in a TDM or TDM/FDM fashion. A mobile device then may be assigned a broadband resource, that is, a sub-band or a group or groups of sub-bands, for an exchange of bearer information, thereby permitting multiple users to transmit simultaneously on the different sub-bands such that each user's transmission is orthogonal to the other users' transmissions.

Preferably, broadband network 301 comprises a 3GPP (Third Generation Partnership Project) Long Term Evolution (LTE) communication network. However, those who are of ordinary skill in the art realize that communication system 100 may operate in accordance with any wireless telecommunication standard employing an Orthogonal Frequency Division Multiplexing (OFDM) modulation scheme, such as a 3GPP2 (Third Generation Partnership Project 2) Evolution communication network, for example, an Ultra Mobile Broadband (UMB) communication network, a Worldwide Interoperability for Microwave Access (Wi-MAX) communication network that operates in accordance with the IEEE (Institute of Electrical and Electronics Engineers) 802.16 standards, a Wireless Local Area Network (WLAN) communication system as described by the IEEE 802.xx standards, for example, the 802.11a/HiperLAN2, 802.11g, or 802.20 standards, or any of multiple proposed ultrawideband (UWB) communication networks. Narrowband network 321 may be any kind of network utilized by public safety organizations and utilizing a corresponding narrowband bandwidth, such as those conforming to the Project 25 standards. The multiple networks 301, 321 may be operated by a same network operator and may be part of a same communication network, or may be different communication networks operated by different network operators.

For example, narrowband network 321 may be a Public Safety Narrowband (PSNB) network operating in the Public Safety Narrowband spectrum (with an uplink band of 799-805, 806-809, or 809-815 MHz respectively paired with a downlink band of 769-775, 851-854, or 854-860 MHz), while broadband network 301 may be a 3GPP LTE network operating in the adjacent C block with an uplink band of 776-787 MHz, which band is separated from the PSNB downlink by a 1 MHz guard band. Correspondingly, broadband mobile device 310 may be a 3GPP LTE-conforming network communication device that communicates with broadband access node 302 in accordance with the 3GPP LTE standards, and narrowband mobile device 330 may be a two-way radio that communicates with a narrowband access node 322 and other two-way radios using a Public Safety Narrowband spectrum. Regardless, it is assumed herein that the narrowband spectrum used by narrowband network 321 is in close enough spectral proximity to the broadband spectrum used by broadband network 301, and that narrowband mobile device 330 is in close enough geographical or physical proximity to broadband mobile device 310, such that an uplink transmission by the broadband mobile device can result in interference on the narrowband reception when the narrowband mobile device is receiving.

For example, in communication system 300, uplink transmissions by broadband mobile device 310 in the B13 and/or B14 frequency bands can interfere with reception, by narrowband mobile device 330, of a narrowband transmission from narrowband access node 322 when the two mobile devices 310 and 330 are geographically or physically proximate to each other, since both the B13 and/or B14 transmission and the narrowband reception use frequencies that are relatively close to each other. For the sake of illustration, it can be assumed that narrowband signal reception of public safety personnel is more important than broadband communications, such as B13 and/or B14 communications, of nearby broadband mobile device 310. Accordingly, communication system 300 provides for mitigation of such interference, thereby minimizing any undesirable radio interference to communications between narrowband access node 322 and narrowband mobile device 330.

Figure 6:
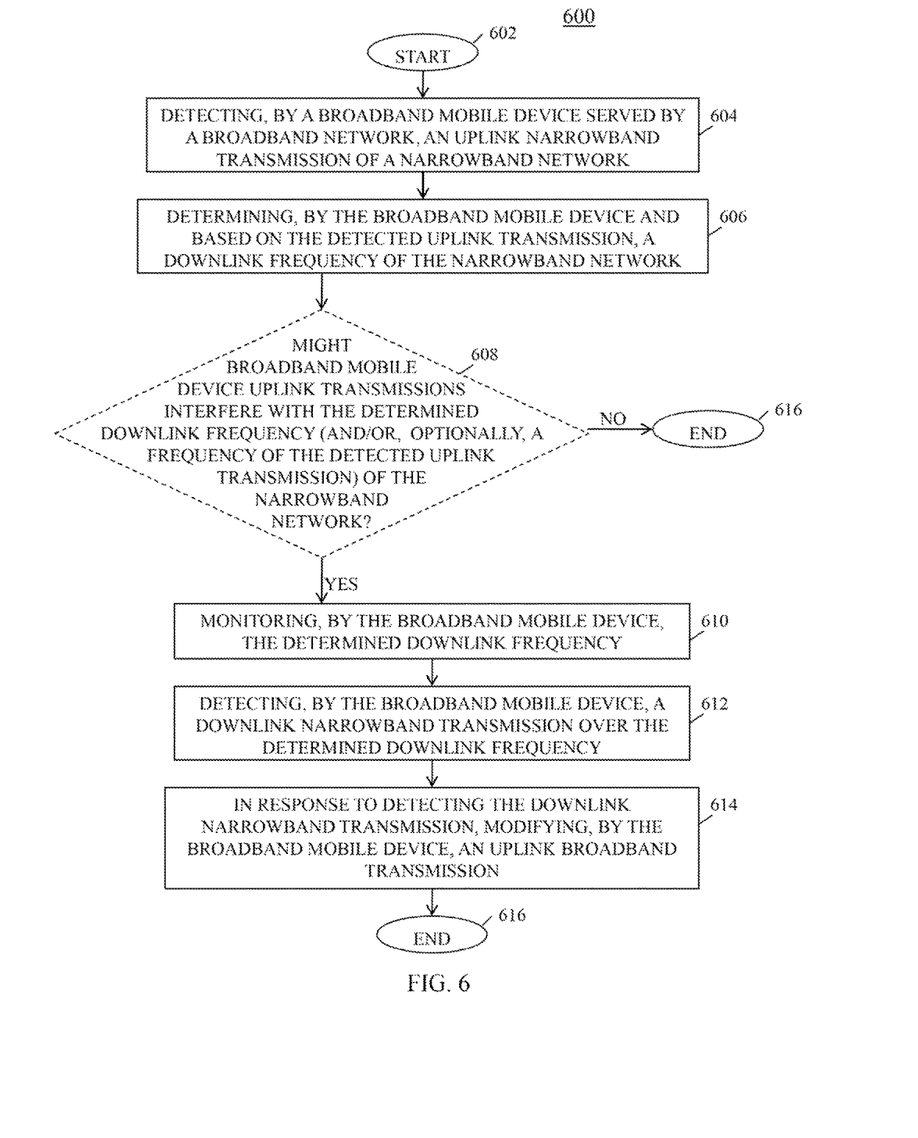
FIG. 6 is a logic flow diagram illustrating a method performed by the communication system of FIG. 3 for mitigating transmission interference between a broadband network and a narrowband network in accordance with various embodiments of the present invention.

Referring now to FIG. 6, a logic flow diagram 600 is provided that illustrates a method performed by communication system 300 to mitigate transmission interference between broadband network 301, and in particular broadband mobile device 310, and narrowband network 321, and in particular narrowband mobile device 330, in accordance with various embodiments of the present invention. It is assumed that broadband mobile device 310 and narrowband mobile device 330 are sufficiently close to each other such that each can detect downlink transmissions to, and uplink transmissions from, the other mobile device.

Logic flow diagram 600 begins (602) when broadband mobile device 310 detects (604) an narrowband uplink transmission of narrowband network 321, for example, from narrowband mobile device 330 to narrowband access node 322, wherein the narrowband transmission is in close enough spectral proximity to at least one bearer channel of the broadband mobile device to result in interference on the narrowband reception when the broadband mobile device is transmitting and the narrowband mobile device is receiving concurrently. That is, broadband mobile device 310 monitors the spectrum utilized by narrowband network 321, wherein narrowband mobile device 330 may transmit on uplink 326. If broadband mobile device 310 detects a strong, spectrally proximate uplink signal in the monitored narrowband network spectrum, then the broadband mobile device can infer that narrowband mobile device 330 is nearby and is transmitting at a frequency corresponding to the strong uplink signal.

In one embodiment of the present invention, broadband mobile device 310 may employ linear predictive coding (LPC) spectral estimation for finding a strong narrowband signal. Linear predictive coding (LPC) is a well-known tool used in audio signal and speech processing to represent the spectral envelope of a digital signal of speech, using a linear predictive model. By use of LPC, broadband mobile device 310 generates a spectrum corresponding to the narrowband bandwidth and then looks for a bump, that is, a power peak, in the spectrum. In one such embodiment, at least one memory device 504 of broadband mobile device 310 includes a peak power threshold associated with a received signal power. Broadband mobile device 310 then compares a power level of the detected peak power to the peak power threshold and, when the power level of the detected power peak exceeds the peak power threshold, the broadband mobile device can infer that narrowband mobile device 330 is nearby and is transmitting at a frequency corresponding to the power peak.

In another such embodiment, at least one memory device 504 of broadband mobile device 310 may include a power differential threshold associated with a differential between an average signal power across a measured bandwidth and a peak signal power. When broadband mobile device 310 generates the spectrum corresponding to the narrowband bandwidth and determines a peak power of the spectrum, the broadband mobile device calculates both an average signal power across the spectrum and the peak detected power and determines a difference between the two. When the difference between the peak detected power and average signal power exceeds the power differential threshold, then broadband mobile device 310 can infer that narrowband mobile device 330 is nearby and is transmitting at a frequency corresponding to the power peak.

In another embodiment of the present invention, broadband mobile device 310 may employ a Fast Fourier Transform (FFT), also well-known in the art, to analyze the spectrum corresponding to the narrowband bandwidth. Broadband mobile device 310 then can search for a frequency associated with an associated power level in excess of the peak power threshold, or whose associated power level exceeds an average signal power calculated across the spectrum by more than the power differential threshold, and when the threshold is exceeded can infer that narrowband mobile device 330 is nearby and is transmitting at a frequency corresponding to the power peak. An advantage of using LPC spectral estimation is that broadband mobile device 310 may monitor, at any given time, the entire bandwidth in which narrowband mobile device 330 might transmit and detect a narrowband uplink transmission anywhere in that bandwidth.

In response to detecting a strong uplink signal, broadband mobile device 310 determines (606) a corresponding downlink frequency of the narrowband network. That is, each uplink frequency band of narrowband network 321 that may be used by narrowband mobile device 330 for an uplink transmission is paired with a corresponding downlink frequency band of narrowband network 321 that may be used by narrowband access node 322 for a downlink transmission. In one embodiment of the present invention, at least one memory device 504 of broadband mobile device 310 may maintain a mapping of paired uplink and downlink frequencies. In another embodiment of the present invention, at least one memory device 504 of broadband mobile device 310 may maintain a frequency offset between paired uplink and downlink frequencies, such that when the broadband mobile device 310 knows of (for example, detects) one of either a narrowband uplink frequency or a narrowband downlink frequency, the broadband mobile device is able to determine the corresponding narrowband downlink frequency or narrowband uplink frequency based on the offset.

In response to determining the narrowband downlink frequency of the narrowband network that corresponds to the detected narrowband uplink transmission of narrowband network 321, broadband mobile device 310 optionally may determine (608) whether its uplink transmission might interfere with the determined narrowband downlink frequency (and/or, optionally, with a frequency of the detected narrowband uplink transmission) of the narrowband network. When broadband mobile device 310 determines that its uplink transmission will not interfere with the determined narrowband downlink frequency (and/or a frequency of the detected narrowband uplink transmission) of the narrowband network, the broadband mobile device may determine not to monitor the determined narrowband downlink frequency and logic flow 600 ends (616). However, when broadband mobile device 310 determines that its uplink transmission might interfere with the determined narrowband downlink frequency (and/or a frequency of the detected narrowband uplink transmission) of the narrowband network, the broadband mobile device may determine to monitor the determined narrowband downlink frequency and logic flow 600 proceeds to step 610.

For example, broadband mobile device 310 may calculate, using known techniques, one or more of inter-modulation distortion (IMD), blocking, and out-of-band emissions (DOBE) impacts to the determined narrowband downlink frequency (and/or, optionally, to the frequency of the narrowband uplink transmission) due to baseband uplink transmissions. If the IMD, blocking, or DOBE occurring in the determined narrowband downlink frequency is less than a corresponding threshold, then broadband mobile device 310 may determine that that its uplink transmission does not interfere with the determined narrowband downlink frequency (and/or, optionally, uplink frequency) and, accordingly, determine not to monitor the determined narrowband downlink frequency, and logic flow 600 ends (616). However, if broadband mobile device 310 determines that the IMD, blocking, or DOBE occurring in the determined narrowband downlink frequency exceeds the corresponding threshold, then the broadband mobile device may determine that its uplink transmission might interfere with the determined narrowband downlink frequency and, accordingly, determine to monitor the determined narrowband downlink frequency and logic flow 600 proceeds to step (610).

At step (610), in response to determining the narrowband downlink frequency of the narrowband network that corresponds to the detected narrowband uplink transmission of narrowband network 321 (and, optionally, in response to broadband mobile device 310 determining that its uplink transmission poses a risk to the determined narrowband downlink frequency), broadband mobile device 310 then monitors the determined narrowband downlink frequency in order to detect (612) a corresponding narrowband downlink transmission by narrowband access node 322 to narrowband mobile device 330. Thus, by detecting a narrowband uplink transmission by narrowband mobile device 330, broadband mobile device 310 is able to determine both whether to monitor, and what frequency to monitor, for the narrowband downlink transmission.

Again, by way of example, broadband mobile device 310 may use either FFT or LPC spectral estimation schemes, similar to the schemes described above with respect to uplink signal detection, to detect the narrowband downlink transmission and further, similarly, may employ a downlink peak power threshold and/or a downlink power differential threshold, maintained in the at least one memory device 504 of the broadband mobile device 310, to detect the narrowband downlink transmission. Further, as broadband mobile device 310 has determined a particular narrowband frequency to monitor, the broadband mobile device need not continuously monitor downlink 328 but instead may monitor the downlink intermittently, for example, when not transmitting or receiving broadband signals in broadband network 301.

In response to detecting a narrowband downlink transmission by narrowband access node 322 to narrowband mobile device 330, broadband mobile device 310 then modifies (614) a broadband uplink transmission so as to ensure that the broadband uplink transmission by the broadband mobile device does not interfere with the spectrally proximate narrowband reception by narrowband mobile device 330. Logic flow 600 then ends (616).

For example, in one embodiment of the present invention, broadband mobile device 310 may modify a current, or imminent, broadband uplink data transmission by storing the data in a data buffer of at least one memory device 504 of the broadband mobile device, halting a transmission of the data by the broadband mobile device, counting down a predetermined delay period by reference to timer 512, which delay period is maintained by the at least one memory device 504, and then automatically enabling transmission of data by the broadband mobile device after expiration of the delay period. In another embodiment of the present invention, broadband mobile device 310 may modify a current, or imminent, broadband uplink data transmission by conveying a request, to broadband access node 302, for a new uplink resource or an uplink resource reassignment. In response to receipt of the request, scheduling module 312 determines a second, available broadband resource that is a greater distance, in frequency and/or time, from the narrowband spectrum than a first broadband resource currently assigned to broadband mobile device 310 and assigns, and conveys an assignment of, the second broadband resource to the broadband mobile device. Broadband mobile device 310 then conveys the broadband uplink data transmission over the second broadband resource.

Thus, communication system 300 provides for a determination, by broadband communication device 310, of a narrowband downlink frequency to monitor based on a detected narrowband uplink transmission, which the narrowband uplink transmission is in close enough spectral proximity to at least one bearer channel of the broadband mobile device to result in interference on the narrowband reception when the broadband mobile device is transmitting and a narrowband mobile device is receiving. Communication system 300 then provides that, in response to detecting a narrowband downlink transmission at the monitored narrowband downlink frequency, broadband communication device 310 may modify a broadband uplink transmission to ensure that the broadband uplink transmission does not interfere with narrowband downlink reception, thereby mitigating radio frequency interference by the broadband mobile device with narrowband network 321 downlink transmissions. By monitoring a higher, and more easily detected, uplink energy in a wide band spectrum utilized by narrowband network 321 to locate the narrowband downlink frequency, broadband mobile device is able to perform more sensitive monitoring of a very specific narrowband frequency or frequencies to detect what may be potentially weaker downlink signals.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method for mitigating radio frequency interference by a broadband mobile device, the method comprising:
   detecting, at a broadband mobile device, a geographically or physically proximate narrowband uplink transmission, wherein a frequency band of the narrowband uplink transmission is outside of frequency bands employed by the broadband mobile device for broadband uplink and downlink transmissions and wherein the narrowband uplink transmission is in close enough spectral proximity to at least one bearer channel of the broadband mobile device to result in interference on the narrowband reception when the broadband mobile device is transmitting and a narrowband mobile device is receiving;
   determining, based on the detected narrowband uplink transmission, a corresponding narrowband downlink frequency, wherein a frequency band of the narrowband downlink transmission is outside of the frequency bands employed by the broadband mobile device for broadband uplink and downlink transmissions;
   monitoring the determined narrowband downlink frequency;
   detecting a narrowband downlink transmission at the monitored narrowband downlink frequency; and
   in response to detecting the narrowband downlink transmission at the monitored narrowband downlink frequency, modifying a broadband uplink transmission to ensure the broadband uplink transmission does not interfere with narrowband downlink reception, wherein modifying comprises scheduling a second broadband resource for the broadband mobile device that results in causing less interference to the narrowband downlink transmission than a first broadband resource currently assigned to the broadband mobile device.

2. The method of claim 1, wherein the broadband transmission and the narrowband reception operate in a 700 MHz frequency band.

3. The method of claim 1, wherein determining a corresponding narrowband downlink frequency comprises determining a narrowband downlink frequency that is paired with a frequency of the detected narrowband uplink transmission.

4. The method of claim 1, wherein the broadband mobile device is a 3GPP LTE-conforming network communication device that communicates with a broadband access node and the narrowband mobile device is a two-way radio that communicates with a narrowband access node and other two-way radios.

5. The method of claim 1, wherein detecting a geographically or physically proximate narrowband uplink transmission comprises:
determining a peak power of a monitored narrowband spectrum;
comparing the determined peak power to a peak power threshold; and
when the determined peak power exceeds the peak power threshold, determining that a geographically or physically proximate narrowband uplink transmission has been detected.

6. The method of claim 1, wherein detecting a geographically or physically proximate narrowband uplink transmission comprises:
determining a peak power and an average power of a monitored narrowband spectrum;
determining a difference between the peak power and the average power;
comparing the difference to a power differential threshold; and
when the difference exceeds the power differential threshold, determining that a geographically or physically proximate narrowband uplink transmission has been detected.

7. The method of claim 1, wherein scheduling a second broadband resource comprises:
requesting, by the broadband mobile device, a resource reassignment; and
in response to requesting the resource reassignment receiving an assignment of the second broadband resource for use in a broadband uplink transmission.

8. The method of claim 1, further comprising:
determining whether an uplink transmission by the broadband mobile device might interfere with one or more of the determined narrowband downlink frequency and a frequency of the detected narrowband uplink transmission;
in response to determining that the uplink transmission by the broadband mobile device does not interfere with one or more of the determined narrowband downlink frequency and a frequency of the detected narrowband uplink transmission, determining not to monitor the determined narrowband downlink frequency; and
in response to determining that the uplink transmission by the broadband mobile device does interfere with one or more of the determined narrowband downlink frequency and a frequency of the detected narrowband uplink transmission, determining to monitor the determined narrowband downlink frequency.

9. A broadband mobile device capable of operating in an Orthogonal Frequency Division Multiple Access (OFDMA) communication system, the mobile device comprising:
an at least one receiver that is configured to receive broadband communications and narrowband communications;
a transmitter that is configured to transmit broadband communications; and
a processor that is configured to:
detect a geographically or physically proximate narrowband uplink transmission, wherein a frequency band of the narrowband uplink transmission is outside of frequency bands employed by the broadband mobile device for broadband uplink and downlink transmissions and wherein the narrowband uplink transmission is in close enough spectral proximity to at least one bearer channel of the mobile device to result in interference on the narrowband reception when the mobile device is transmitting and a narrowband mobile device is receiving;
determine, based on the detected narrowband uplink transmission, a corresponding narrowband downlink frequency, wherein a frequency band of the narrowband downlink transmission is outside of the frequency bands employed by the broadband mobile device for broadband uplink and downlink transmissions;
monitor the determined narrowband downlink frequency;
detect a narrowband downlink transmission at the monitored narrowband downlink frequency; and
in response to detecting the narrowband downlink transmission at the monitored narrowband downlink frequency, modify a broadband uplink transmission to ensure the broadband uplink transmission does not interfere with narrowband downlink reception, wherein modifying the broadband uplink transmission comprises requesting alternate resource allocation for the broadband uplink transmission from a broadband access node scheduler that results in causing less interference to the narrowband downlink transmission than a first broadband resource currently assigned to the broadband mobile device.

10. The mobile device of claim 9, wherein the broadband transmission and the narrowband reception operate in a 700 MHz frequency band.

11. The mobile device of claim 9, wherein the processor is configured to determine a corresponding narrowband downlink frequency by determining a narrowband downlink frequency that is paired with a frequency of the detected narrowband uplink transmission.

12. The mobile device of claim 9, wherein the broadband mobile device is a 3GPP LTE-conforming network communication device that communicates with a broadband access node and the narrowband mobile device is a two-way radio that communicates with a narrowband access node and other two-way radios.

13. The mobile device of claim 9, wherein the processor is configured to detect a geographically or physically proximate narrowband uplink transmission by:
determining a peak power of a monitored narrowband spectrum;
comparing the determined peak power to a peak power threshold; and when the determined peak power exceeds the peak power threshold, determining that a geographically or physically proximate narrowband uplink transmission has been detected.

14. The mobile device of claim 9, wherein the processor is configured to detect a geographically or physically proximate narrowband uplink transmission by:
    determining a peak power and an average power of a monitored narrowband spectrum;
    determining a difference between the peak power and the average power;
    comparing the difference to a power differential threshold; and
    when the difference exceeds the power differential threshold, determining that a geographically or physically proximate narrowband uplink transmission has been detected.

15. The mobile device of claim 9, wherein the processor is configured to schedule a second broadband resource by:
    requesting, by the broadband mobile device, a resource reassignment; and
    in response to requesting the resource reassignment receiving an assignment of the second broadband resource for use in a broadband uplink transmission.

16. The mobile device of claim 9, wherein the processor is configured to:
    determine whether an uplink transmission by the broadband mobile device might interfere with one or more of the determined narrowband downlink frequency and a frequency of the detected narrowband uplink transmission;
    in response to determining that the uplink transmission by the broadband mobile device does not interfere with one or more of the determined narrowband downlink frequency and a frequency of the detected narrowband uplink transmission, determine not to monitor the determined narrowband downlink frequency; and
    in response to determining that the uplink transmission by the broadband mobile device does interfere with one or more of the determined narrowband downlink frequency and a frequency of the detected narrowband uplink transmission, determine to monitor the determined narrowband downlink frequency.

17. A system for mitigating radio frequency interference between narrowband public safety and broadband communications devices, the system comprising:
    a narrowband mobile device configured to transmit and receive narrowband communications; and
    a Third Generation Partnership Project (3GPP)-conforming mobile device configured to communicate with a 3GPP-conforming broadband network, wherein the 3GPP-conforming mobile device is configured to mitigate the potential for interference between the narrowband mobile device and the 3GPP-conforming mobile device by:
        detecting a narrowband uplink transmission, wherein a frequency band of the narrowband uplink transmission is outside of frequency bands employed by the 3GPP-conforming mobile device for broadband uplink and downlink transmissions;
        determining, based on the detected narrowband uplink transmission, a corresponding narrowband downlink frequency, wherein a frequency band of the narrowband downlink transmission is outside of the frequency bands employed by the 3GPP-conforming mobile device for broadband uplink and downlink transmissions;
        monitoring the determined narrowband downlink frequency;
        detecting a narrowband downlink transmission at the monitored narrowband downlink frequency; and
        in response to detecting the narrowband downlink transmission at the monitored narrowband downlink frequency, modifying a broadband uplink transmission to ensure the broadband uplink transmission does not interfere with narrowband downlink reception, wherein modifying comprises scheduling a second broadband resource for the broadband mobile device that results in causing less interference to the narrowband downlink transmission than a first broadband resource currently assigned to the broadband mobile device.

* * * * *